US011991063B2

(12) United States Patent
Mochida et al.

(10) Patent No.: US 11,991,063 B2
(45) Date of Patent: May 21, 2024

(54) ANOMALY DETECTION DEVICE, ANOMALY DETECTION METHOD, AND PROGRAM

(71) Applicant: NIPPON TELEGRAPH AND TELEPHONE CORPORATION, Tokyo (JP)

(72) Inventors: Yasuhiro Mochida, Musashino (JP); Takahiro Yamaguchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/771,997

(22) PCT Filed: Nov. 11, 2019

(86) PCT No.: PCT/JP2019/044199
§ 371 (c)(1),
(2) Date: Apr. 26, 2022

(87) PCT Pub. No.: WO2021/095106
PCT Pub. Date: May 20, 2021

(65) Prior Publication Data
US 2022/0368618 A1 Nov. 17, 2022

(51) Int. Cl.
*H04L 12/28* (2006.01)
*H04L 43/0894* (2022.01)
(Continued)

(52) U.S. Cl.
CPC ...... *H04L 43/0894* (2013.01); *H04L 47/2416* (2013.01); *H04L 47/2483* (2013.01)

(58) Field of Classification Search
CPC ............. H04L 47/2416; H04L 47/2483
See application file for complete search history.

(56) References Cited

U.S. PATENT DOCUMENTS

| 10,652,262 B2* | 5/2020 | Wang ............... H04L 47/41 |
| 2014/0297004 A1* | 10/2014 | Kim ............... H04L 63/1408 |
| | | 700/79 |

(Continued)

OTHER PUBLICATIONS

International Searching Authority, English Translation of the Written Opinion of the International Searching Authority PCT/JP2019/044199, dated Jan. 21, 2020, WIPO, pp. 1-3. (Year: 2020).*

(Continued)

*Primary Examiner* — Elisabeth Benoit Magloire
(74) *Attorney, Agent, or Firm* — Harness, Dickey & Pierce, P.L.C.

(57) ABSTRACT

An abnormality detection device according to the present invention is a video transmission state abnormality detection device connected via a network to a plurality of video transmission devices, an IP packet transfer device on the transmission side, an IP packet transfer device on the reception side, and a plurality of video reception devices. The video transmission state abnormality detection device prepares a transmission/reception IP flow table by aggregating IP flow information for the devices, detects an abnormality in transmission on the basis of the transmission/reception IP flow table, and specifies the location of the abnormality. The abnormality detection device according to the present invention can automatically detect the amount of traffic and specify which part of a transmission path an abnormality is caused on, without the need for advance setting. Therefore, video or sound traffic can be monitored efficiently.

6 Claims, 14 Drawing Sheets

(51) Int. Cl.
  *H04L 47/2416* (2022.01)
  *H04L 47/2483* (2022.01)

(56) References Cited

U.S. PATENT DOCUMENTS

2020/0090503 A1* 3/2020 Rolf ................... G08G 1/0116
2020/0162407 A1* 5/2020 Tillotson ................ H04L 43/16

OTHER PUBLICATIONS

KR-20050066048-A (Year: 2005).*
D. Harrington et al., An Architecture for Describing Simple Network Management Protocol (SNMP) Management Frameworks, Network Working Group Request for Comments: 3411, Dec. 2002.
R. Gerhards, The Syslog Protocol, Network Working Group Request for Comments: 5424, Mar. 2009.

* cited by examiner

| TRANSMISSION DEVICE NAME | TRANSMISSION MAC ADDRESS | TRANSMISSION SOURCE ADDRESS | TRANSMISSION SOURCE PORT | DESTINATION ADDRESS | DESTINATION PORT |
|---|---|---|---|---|---|
| ENCAP1 | AA:BB:CC:DD:EE:01 | 192.168.1.1 | 10000 | 192.168.1.11 | 10000 |
| ENCAP2 | AA:BB:CC:DD:EE:02 | 192.168.1.2 | 10000 | 239.0.1.12 | 10000 |
| ENCAP3 | AA:BB:CC:DD:EE:03 | 192.168.1.3 | 10000 | 192.168.1.13 | 10000 |

Fig. 6

```
[6]
{
  "version": "15:724533950",
  "hostname":"ENCAP1",  ──── TRANSMISSION DEVICE NAME
  "caps": {},
  "href": "http://192.168.0.1:9999/",
  "api": {
    "versions": ["v1.2"],
    "endpoints": [
      {
        "host": "192.168.0.1",
        "port": 9999,
        "protocol": "http"
      }
    ]
  },
  "services": [],
  "label": "ENCAP1",
  "description": " ENCAP1 ",
  "tags": {},
  "id": "3b8be755-08ff-452b-b217-c8151eb21193",
  "clocks": [
    {
      "name": "clk1",
      "ref_type":"ptp",
      "traceable": true,
      "version": "IEEE1588-2008",
      "gmid": "08-00-11-ff-fe-21-e1-b0",
      "locked": true
    }
  ],
  "interfaces" : [
    {
      "name":"eth0",
      "chassis_id":"AA:BB:CC:DD:EE:01",
      "port_id":"AA:BB:CC:DD:EE:01"  ──── TRANSMISSION MAC ADDRESS
    }
  ]
}
```

Fig. 7

```
[7]
{
 "receiver_id": "0a174530-e3cf-11e6-bf01-fe5513903413",
 "master_enable": true,
 "activation": {
  "mode": "activate_immediate",
  "requested_time": "1496759200:0",
  "activation_time": "1496759200:0"
 },
 "transport_params": [{
  "source_ip": "192.168.1.1",             ← TRANSMISSION SOURCE ADDRESS
  "destination_ip": "192.168.1.11",       ← DESTINATION ADDRESS
  "source_port": 10000,                   ← TRANSMISSION SOURCE PORT
  "destination_port": 10000,              ← DESTINATION PORT
  "fec_enabled": false,
  "fec_destination_ip": "192.168.1.11",
  "fec_type": "XOR",
  "fec_mode": "2D",
  "fec_block_width": 50,
  "fec_block_height": 50,
  "fec1D_destination_port": 5002,
  "fec2D_destination_port": 5004,
  "fec1D_source_port": 5002,
  "fec2D_source_port": 5004,
  "rtcp_enabled": true,
  "rtcp_destination_ip": "192.168.1.11",
  "rtcp_destination_port": 5008,
  "rtcp_source_port": 5008,
  "rtp_enabled": true
 }]
}
```

| RECEPTION DEVICE NAME | RECEPTION MAC ADDRESS | TRANSMISSION SOURCE ADDRESS | TRANSMISSION SOURCE PORT | DESTINATION ADDRESS | DESTINATION PORT |
|---|---|---|---|---|---|
| DECAP1 | AA:BB:CC:DD:EE:11 | 192.168.1.1 | 10000 | 192.168.1.11 | 10000 |
| DECAP2 | AA:BB:CC:DD:EE:12 | 192.168.1.2 | 10000 | 239.0.1.12 | 10000 |
| DECAP2 | AA:BB:CC:DD:EE:13 | 192.168.1.3 | 10000 | 239.0.1.12 | 10000 |
| DECAP4 | AA:BB:CC:DD:EE:14 | 192.168.1.4 | 10000 | 192.168.1.14 | 10000 |

Fig. 9

[9]    INTEGRATED ENTRY

| TRANSMISSION DEVICE NAME | TRANSMISSION MAC ADDRESS | RECEPTION DEVICE NAME | RECEPTION MAC ADDRESS | TRANSMISSION SOURCE ADDRESS | TRANSMISSION SOURCE PORT | DESTINATION ADDRESS | DESTINATION PORT |
|---|---|---|---|---|---|---|---|
| ENCAP1 | AA:BB:CC:DD:EE:01 | DECAP1 | AA:BB:CC:DD:EE:11 | 192.168.1.1 | 10000 | 192.168.1.11 | 10000 |
| ENCAP2 | AA:BB:CC:DD:EE:02 | DECAP2 | AA:BB:CC:DD:EE:12 | 192.168.1.2 | 10000 | 239.0.1.12 | 10000 |
|  |  | DECAP3 | AA:BB:CC:DD:EE:13 |  |  |  |  |
| ENCAP3 | AA:BB:CC:DD:EE:03 | - | - | 192.168.1.3 | 10000 | 192.168.1.13 | 10000 |
| - | - | DECAP4 | AA:BB:CC:DD:EE:14 | 192.168.1.4 | 10000 | 192.168.1.14 | 10000 |

BLANK

| PORT NUMBER | OPPOSING MAC ADDRESS | OPPOSING DEVICE NAME |
|---|---|---|
| 1 | AA:BB:CC:DD:EE:01 | ENCAP1 |
| 2 | AA:BB:CC:DD:EE:02 | ENCAP2 |
| 3 | AA:BB:CC:DD:EE:03 | ENCAP3 |
| 4 | , | , |

Fig. 11

[11]
```
v=0
o=- 1443716955 1443716955 IN IP4 192.168.1.11
s=st2110 0-0-0
t=0 0
m=video 10000 RTP/AVP 96
c=IN IP4 192.168.1.11/32
a=rtpmap:96 raw/90000
a=fmtp:96 sampling=YCbCr-4:2:2; width=1920; height=1080; exactframerate=60000/1001; depth=10;
TCS=SDR; colorimetry=BT709; PM=2110GPM; SSN=ST2110-20:2017; TP=2110TPN;
a=mediaclk:direct=0
a=ts-refclk:ptp=IEEE1588-2008: 08-00-11-ff-fe-21-e1-b0:127
```

| IFACE | STATE | RX_OK | RX_BPS | RX_UTIL | RX_ERR | RX_DRP | RX_OVR | TX_OK | TX_BPS | TX_UTIL | TX_ERR | TX_DRP | TX_OVR |
|---|---|---|---|---|---|---|---|---|---|---|---|---|---|
| Ethernet0 | U | 471,739,839,997 | 653.87 MB/s | 12.77% | 0 | 18,682 | 0 | 409,682,385,925 | 556.84 MB/s | 10.88% | 0 | 0 | 0 |
| Ethernet4 | U | 453,838,006,636 | 632.97 MB/s | 12.36% | 0 | 1,636 | 0 | 388,299,875,056 | 529.34 MB/s | 10.34% | 0 | 0 | 0 |
| Ethernet8 | U | 549,034,764,539 | 761.15 MB/s | 14.87% | 0 | 18,274 | 0 | 457,603,227,659 | 615.20 MB/s | 12.02% | 0 | 0 | 0 |
| Ethernet12 | U | 458,052,204,029 | 636.84 MB/s | 12.44% | 0 | 17,614 | 0 | 388,341,776,615 | 527.37 MB/s | 10.30% | 0 | 0 | 0 |
| Ethernet16 | U | 16,679,692,972 | 13.83 MB/s | 0.27% | 0 | 17,505 | 0 | 18,206,586,265 | 17.51 MB/s | 0.34% | 0 | 0 | 0 |
| Ethernet20 | U | 47,983,339,172 | 35.89 MB/s | 0.70% | 0 | 2,174 | 0 | 58,986,354,359 | 51.83 MB/s | 1.01% | 0 | 0 | 0 |
| Ethernet24 | U | 33,543,533,441 | 36.59 MB/s | 0.71% | 0 | 1,613 | 0 | 43,066,076,370 | 49.92 MB/s | 0.97% | 0 | 0 | 0 |

ANOMALY DETECTION DEVICE, ANOMALY DETECTION METHOD, AND PROGRAM

CROSS-REFERENCE TO RELATED APPLICATIONS

This application is a 371 U.S. National Phase of International Application No. PCT/JP2019/044199, filed on Nov. 11, 2019. The entire disclosure of the above application is incorporated herein by reference.

TECHNICAL FIELD

The present disclosure relates to an abnormality detection device, an abnormality detection method, and a program for detecting an abnormality by monitoring the state of transmission of a video or a sound via an IP network.

BACKGROUND ART

Methods of detecting a state abnormality include Simple Network Management Protocol (SNMP; NPL 1), SYSLOG (NPL 2), etc. In the Simple Network Management Protocol (SNMP; NPL 1), a manager (monitoring server) requests an agent (device to be monitored) to transmit information, and the agent transmits information on the state of the agent itself to the manager in response to the request. The SNMP has a scheme called "trap", in which the agent voluntarily transmits state information when a condition set in advance for the agent is met. In the SYSLOG, when various types of events occur, information on such events is transmitted to a monitoring server.

An abnormal state can be detected by setting in advance a condition for determining a state abnormality from information collected through the SNMP or the SYSLOG.

For example, an abnormality in traffic can be detected by collecting the amount of traffic transmitted by a video transmission device or the amount of traffic received by a video reception device using an information collection protocol such as those described above, and determining whether or not the amount of traffic is in a normal range set in advance.

CITATION LIST

Non Patent Literature

[NPL 1] RFC 3411 (An Architecture for Describing Simple Network Management Protocol (SNMP) Management Frameworks)
[NPL 2] RFC 5424 (The Syslog Protocol)

SUMMARY OF THE INVENTION

Technical Problem

There are video transmission devices that do not support an information collection protocol such as those described above, and an abnormality in such devices cannot be detected.

When a video/sound is transmitted through an IP network, there may be a problem in the setting of an IP packet transfer device, such as a switch or a router, on a transmission path, and the location of an abnormality cannot be specified by only collecting information from a video transmission device. An example of a typical configuration for transmitting a video/sound through an IP network is illustrated in FIG. 1. For example, in the case where VLAN which allows video traffic to flow therethrough is not set for a port of an IP packet transfer device 2 to which a video reception device is connected, the video traffic does not flow to the video reception device even if setting of a video transmission device and the video reception device has been made appropriately, and it is necessary to reexamine the setting of the IP packet transfer device.

The amount of traffic is an important factor for video/sound transmission through a network. While many IP packet transfer devices support an information collection protocol such as the SNMP, how much traffic flows through what port of an IP packet transfer device is varied in accordance with the configuration of connection and the setting of the video transmission device and the video reception device, and therefore the presence or absence of a state abnormality cannot be always determined under the same condition for the amount of traffic for each port. In order to detect an abnormality in the amount of traffic, it has so far been necessary to manually set a normal amount of traffic expected for each port each time the configuration of connection and the setting of the video transmission device and the video reception device are changed. This method is not practical under a situation in which the configuration or the setting is changed frequently.

It is therefore an object of the present invention to solve the foregoing problems. That is, it is an object of the present invention to provide an abnormality detection device, an abnormality detection method, and a program that can solve the following three issues.
(Issue 1) To be able to detect an abnormality in a video transfer device that does not support an information collection protocol
(Issue 2) To be able to detect an abnormality in setting of a transfer device
(Issue 3) To be able to automatically detect an abnormality in the amount of traffic

Means for Solving the Problem

In order to achieve the foregoing object, the abnormality detection device, the abnormality detection method, and the program according to the present invention enable automatic detection of an abnormality about the amount of video/sound traffic in an IP packet transfer device on a transmission path, automatically calculate an expected traffic amount without advance setting, and determine the presence or absence of an abnormality by comparing the expected traffic amount with an amount of traffic actually measured.

Specifically, the present invention provides an abnormality detection device that detects an abnormality in signal transmission, the abnormality detection device being connected to a network including a transmission device that transmits a signal, a reception device that receives the signal, and a transfer device that transfers the signal from the transmission device to the reception device, the abnormality detection device including:

a flow table generation circuit that collects transmission source information and destination information for the signal for each transmission device, that collects transmission source information and destination information for the signal for each reception device, and that generates a transmission/reception flow table by aggregating entries for flows with the same transmission source address, transmission source port, destination address, and destination port, among the transmission source information and the destination information;

a connection table generation circuit that generates a connection table by collecting, for each port of the transfer device, a name and a physical address of the opposing device which is the transmission device or the reception device connected to the port;

a calculation circuit that calculates an expected traffic amount by adding, for each port of the transfer device, amounts of traffic in all the flows corresponding to the opposing device from the transmission/reception flow table on the basis of the name of the opposing device in the connection table; and a comparison circuit that compares an observed traffic amount of traffic actually measured and the expected traffic amount for each port of the transfer device, and that determines that there is an abnormality in traffic amount when there is a predetermined deviation or more therebetween.

The present invention also provides an abnormality detection method of detecting an abnormality in signal transmission in a network including a transmission device that transmits a signal, a reception device that receives the signal, and a transfer device that transfers the signal from the transmission device to the reception device, the abnormality detection method including:

collecting transmission source information and destination information for the signal for each transmission device, collecting transmission source information and destination information for the signal for each reception device, and generating a transmission/reception flow table by aggregating entries for flows with the same transmission source address, transmission source port, destination address, and destination port, among the transmission source information and the destination information;

generating a connection table by collecting, for each port of the transfer device, a name and a physical address of the opposing device which is the transmission device or the reception device connected to the port;

calculating an expected traffic amount by adding, for each port of the transfer device, amounts of traffic in all the flows corresponding to the opposing device from the transmission/reception flow table on the basis of the name of the opposing device in the connection table;

determining an observed traffic amount by actually measuring traffic for each port of the transfer device; and comparing the observed traffic amount and the expected traffic amount, and determining an abnormality in traffic amount when there is a predetermined deviation or more therebetween.

Further, the present invention provides a program for causing a computer to execute the abnormality detection method of detecting an abnormality in signal transmission in a network including a transmission device that transmits a signal, a reception device that receives the signal, and a transfer device that transfers the signal from the transmission device to the reception device.

The phrase "aggregate entries" has the following meaning.

The flow table generation circuit generates a transmission flow table by collecting transmission source information and destination information for the signal for each transmission device;

generates a reception flow table by collecting transmission source information and destination information for the signal for each reception device; and generates a transmission/reception flow table by combining the transmission flow table and the reception flow table by integrating entries for flows with the same transmission source address, transmission source port, destination address, and destination port, among the transmission source information and the destination information indicated in the transmission flow table and the reception flow table, making the fields of the reception device name and the destination address in the entries blank for a flow with no corresponding reception device, and making the fields of the transmission device name and the transmission source address in the entries blank for a flow with no corresponding transmission device.

In the present invention, an abnormality in traffic amount is detected by preparing a transmission/reception flow table by aggregating flow information for each device, calculating a traffic amount from the transmission/reception flow table, and comparing the calculated traffic amount with an actually measured value. With the present invention, the above issues 1 and 3 can be solved by estimating an expected traffic amount on the basis of the flow information.

In the present invention, in addition, it can be determined that there is an abnormality in connection or setting of the transmission device or the reception device when there is an entry including a blank field in the transmission/reception flow table. With the present invention, the above issue 2 can be solved by detecting an abnormality in setting of the transfer device in accordance with the presence or absence of a blank field in the transmission/reception flow table.

The above inventions can be combined where possible.

Effects of the Invention

The present invention can provide an abnormality detection device, an abnormality detection method, and a program that can solve the above three issues.

BRIEF DESCRIPTION OF DRAWINGS

FIG. 5 illustrates an example of a transmission flow table generated by the abnormality detection device according to the present invention.

FIG. 6 illustrates an example of self.json.

FIG. 7 illustrates an example of active.json.

FIG. 8 illustrates an example of a reception flow table generated by the abnormality detection device according to the present invention.

FIG. 9 illustrates an example of a transmission/reception flow table generated by the abnormality detection device according to the present invention.

FIG. 10 illustrates an example of a connection table generated by the abnormality detection device according to the present invention.

FIG. 11 illustrates an example of transportfile.

FIG. 12 illustrates an example of the result of executing a "show interface counters" command, which is cited from https://github.com/Azure/sonic-utilities/blob/master/doc/Command-Reference.md

DESCRIPTION OF EMBODIMENTS

Figure 1:
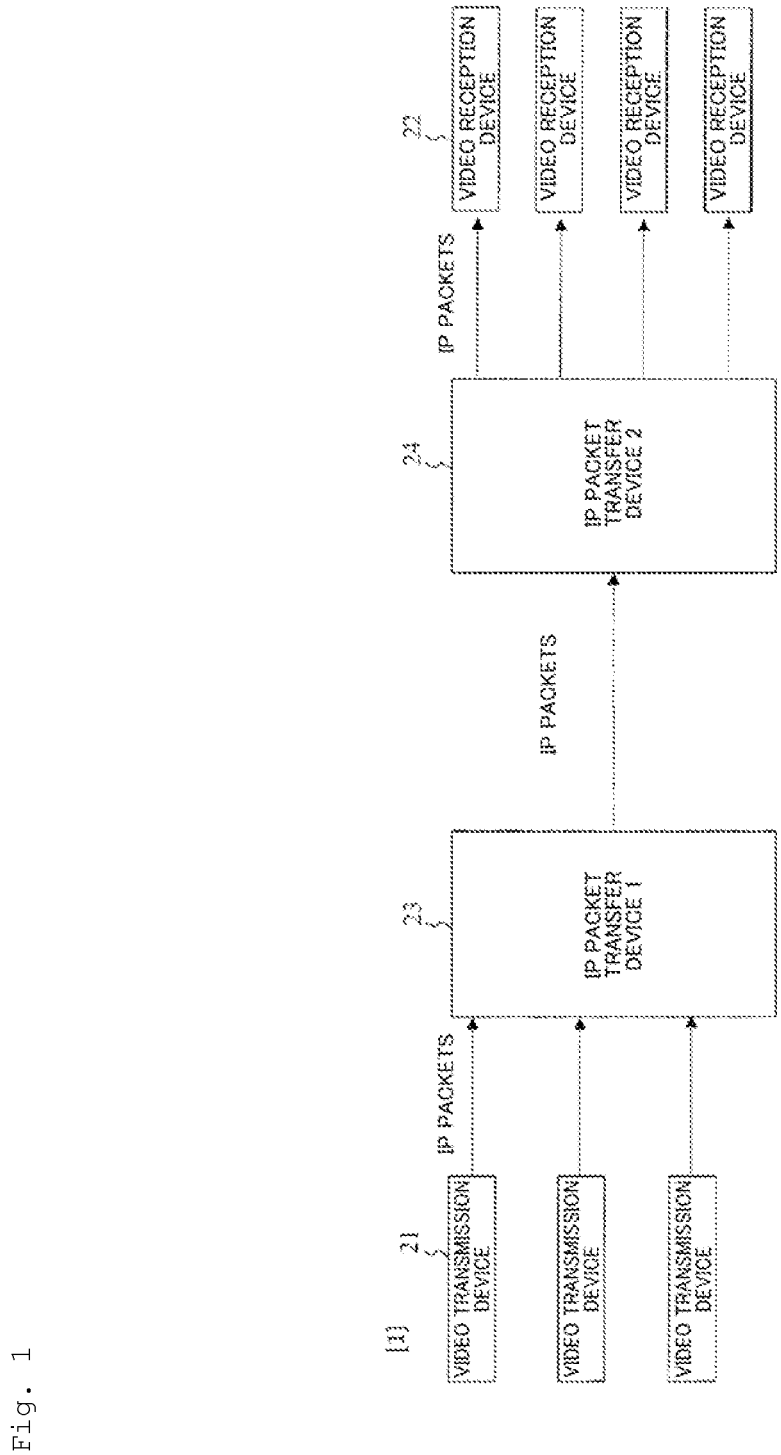
FIG. 1 illustrates an example of the configuration of a communication system.

Embodiments of the present invention will be described with reference to the accompanying drawings. The embodiments described below are examples of the present invention, and the present invention is not limited to the following embodiments. The same reference numerals in the specification and the drawings denote identical constituent elements.

First Embodiment

Figure 13:
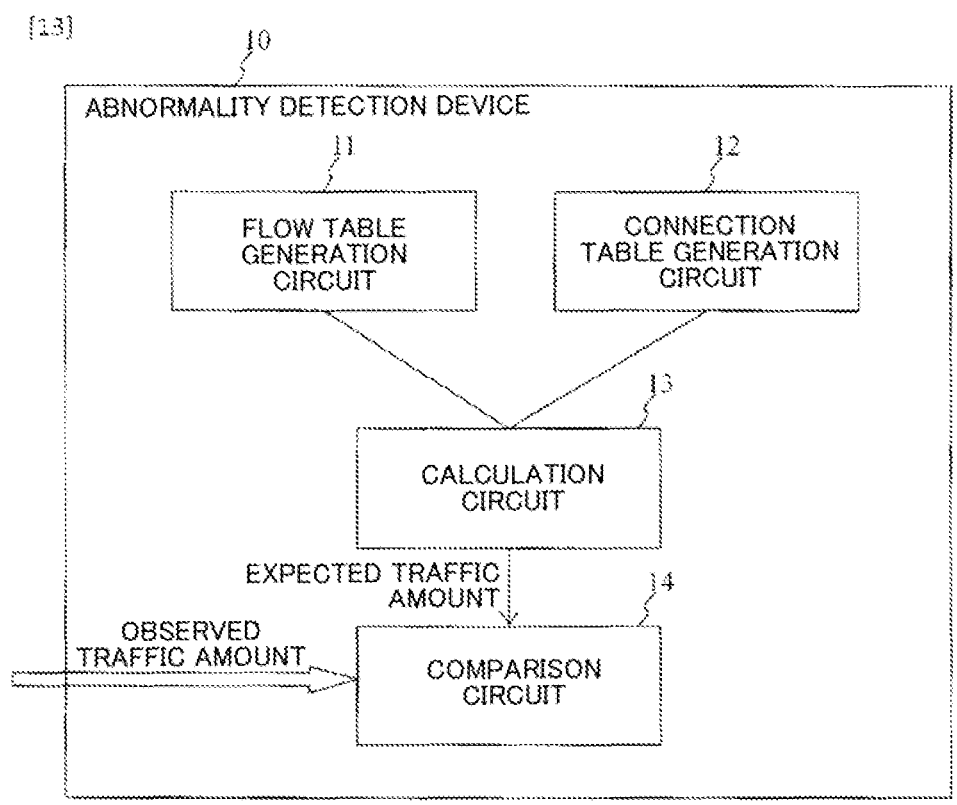
FIG. 13 illustrates the abnormality detection device according to the present invention.

FIG. 13 is a block diagram illustrating an abnormality detection device 10 according to the present embodiment. An abnormality detection device 10 detects an abnormality in signal transmission, and is connected to a network including a transmission device that transmits a signal, a reception device that receives the signal, and a transfer device that transfers the signal from the transmission device to the reception device. The abnormality detection device includes:

a flow table generation circuit 11
that generates a transmission flow table by collecting transmission source information and destination information for the signal for each transmission device,
that generates a reception flow table by collecting transmission source information and destination information for the signal for each reception device, and
that generates a transmission/reception flow table by combining the transmission flow table and the reception flow table by integrating entries for flows with the same transmission source address, transmission source port, destination address, and destination port, among the transmission source information and the destination information indicated in the transmission flow table and the reception flow table, making the fields of the reception device name and the destination address in the entries blank for a flow with no corresponding reception device, and making the fields of the transmission device name and the transmission source address in the entries blank for a flow with no corresponding transmission device;
a connection table generation circuit 12 that generates a connection table by collecting, for each port of the transfer device, a name and a physical address of the opposing device which is the transmission device or the reception device connected to the port;
a calculation circuit 13 that calculates an expected traffic amount by adding, for each port of the transfer device, amounts of traffic in all the flows corresponding to the opposing device from the transmission/reception flow table on the basis of the name of the opposing device in the connection table; and
a comparison circuit 14 that compares an observed traffic amount of traffic actually measured and the expected traffic amount for each port of the transfer device, and that determines that there is an abnormality in traffic amount when there is a predetermined deviation or more therebetween.

The abnormality detection device 10 is connected to a communication system, and determines the presence or absence of an abnormality by automatically calculating the amount of video/sound traffic expected to flow through an IP packet transfer device from video/sound connection control information and comparing the calculated expected traffic amount with an amount of traffic actually observed.

Figure 2:
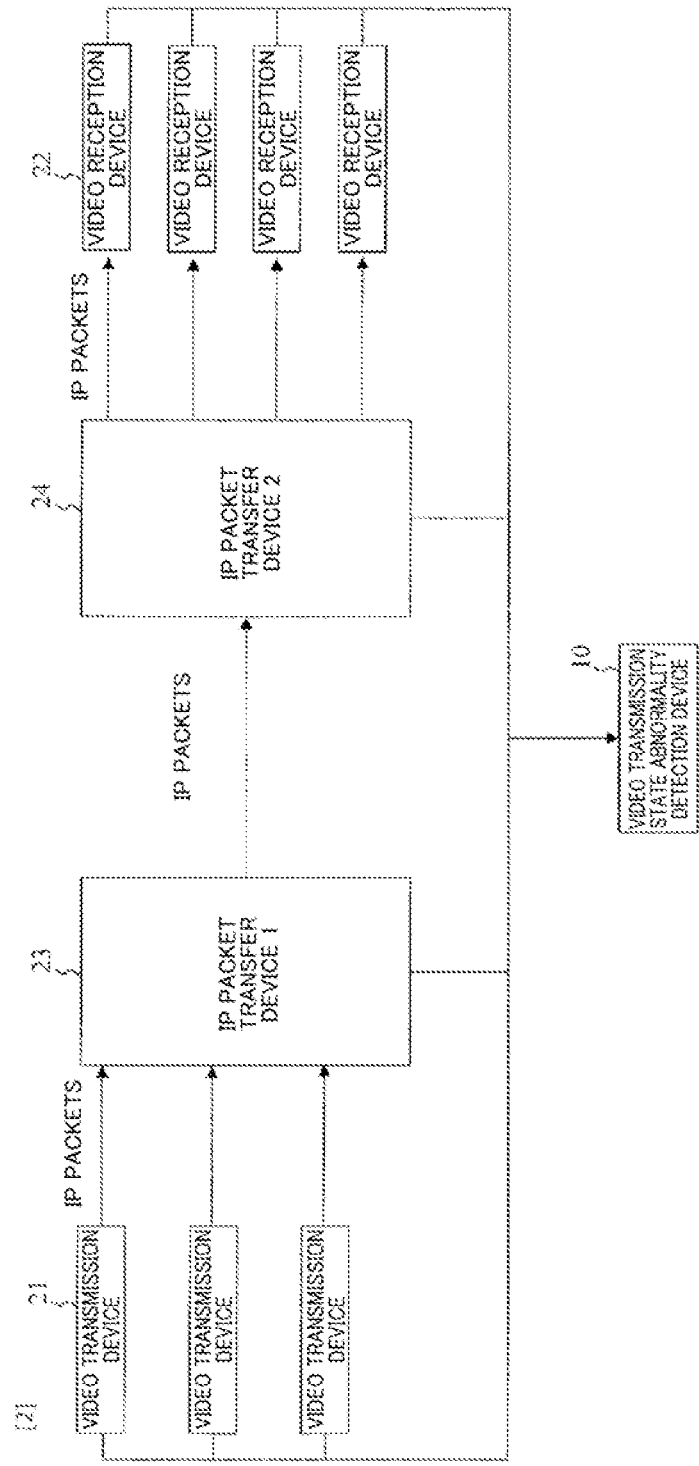
FIG. 2 illustrates an example of the configuration of a communication system to which an abnormality detection device according to the present invention is connected.

FIG. 2 illustrates the abnormality detection device 10 which is connected to a communication system that transmits a video using SMPTE ST 2110-20. The SMPTE ST 2110-20 is a standard for storing and transmitting uncompressed video data in IP packets. Since the video data are uncompressed, the bit rate can be calculated once the video format is determined. While video transmission is described herein, the same technique is also applicable to a case where the data also include a sound and a case where the data include only a sound.

The communication system in FIG. 2 is constituted from a video transmission device 21, a video reception device 22, an IP packet transfer device (23, 24), and a video transmission state abnormality detection device 10. The video transmission device 21 transmits video data using the SMPTE ST 2110-20. The video reception device 22 receives video data using the SMPTE ST 2110-20. The IP packet transfer device (23, 24) transfers IP packets. An IP flow transmitted and received by the video transmission device 21 and the video reception device 22 is controlled in accordance with Network Media Open Specification (NMOS) which is a standard for mutual connection formulated by AMWA, and IP flow information for each device can be acquired using the NMOS.

Figure 3:
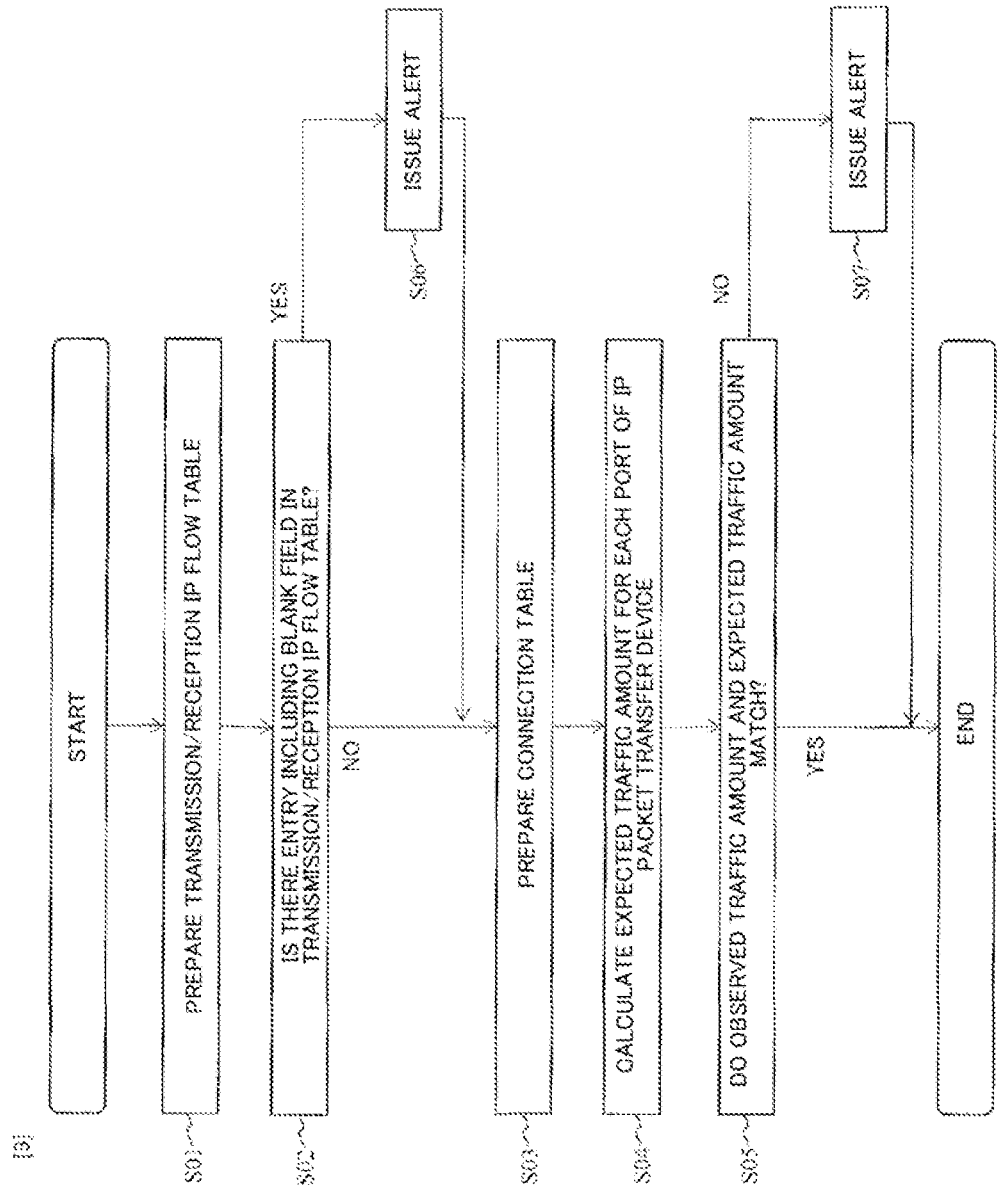
FIG. 3 is a flowchart illustrating an abnormality detection method according to the present invention.
Figure 4:
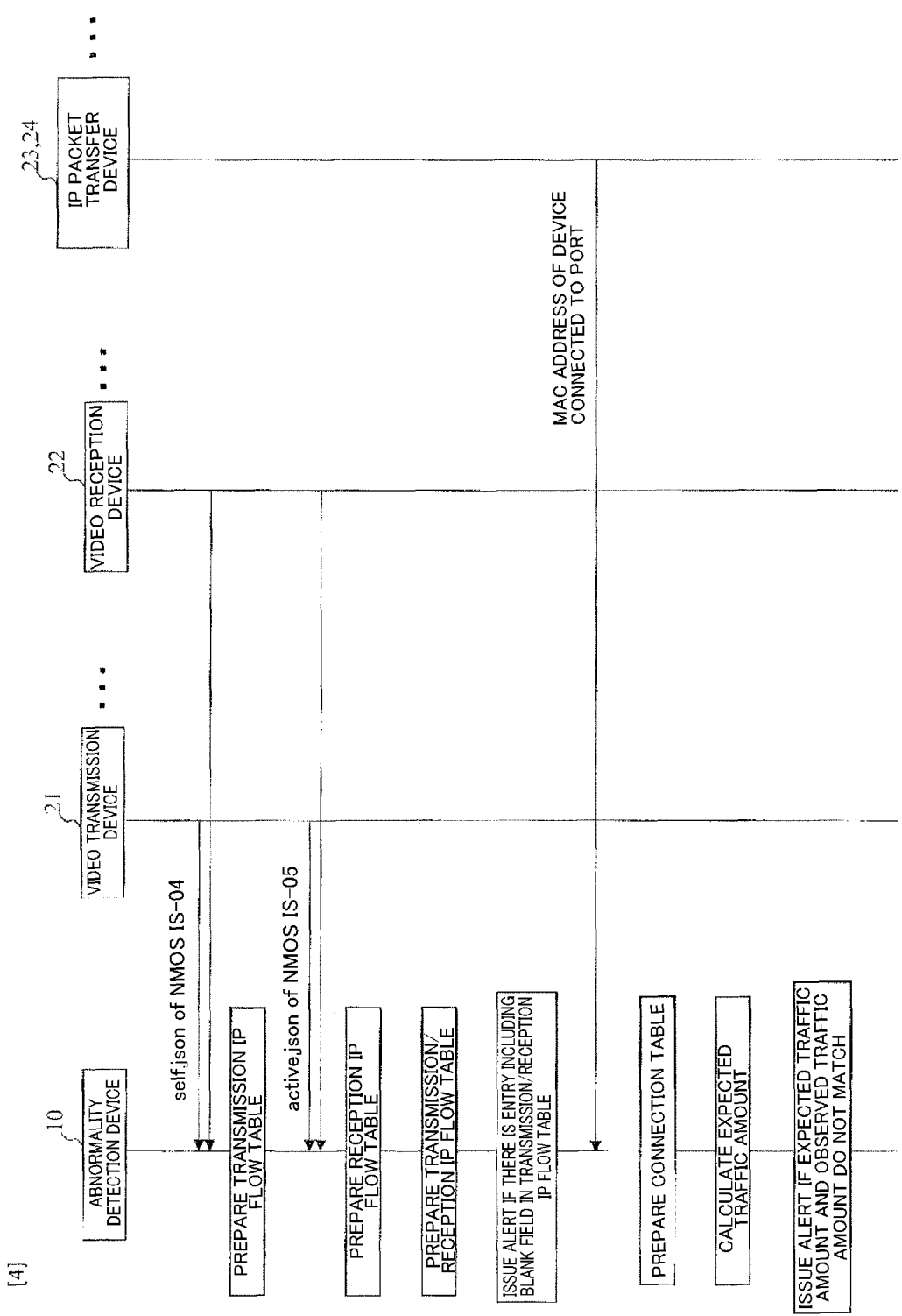
FIG. 4 illustrates operation of the abnormality detection device according to the present invention.

FIG. 3 is a flowchart illustrating an abnormality detection method used by the abnormality detection device 10. FIG. 4 illustrates a flow of information among the abnormality detection device 10, the video transmission device 21, the video reception device 22, and the IP packet transfer device (23, 24).

The abnormality detection method according to the present embodiment is an abnormality detection method of detecting an abnormality in signal transmission in a network including a transmission device 21 that transmits a signal, a reception device 22 that receives the signal, and a transfer device (23, 24) that transfers the signal from the transmission device 21 to the reception device 22, the abnormality detection method including:

generating a transmission flow table by collecting transmission source information and destination information for the signal for each transmission device 21;
generating a reception flow table by collecting transmission source information and destination information for the signal for each reception device 22;
generating a transmission/reception flow table (step S01) by combining the transmission flow table and the reception flow table by integrating entries for flows with the same transmission source address, transmission source port, destination address, and destination port, among the transmission source information and the destination information indicated in the transmission flow table and the reception flow table, making the fields of the reception device name and the destination address in the entries blank for a flow with no corresponding reception device, and making the fields of the transmission device name and the transmission source address in the entries blank for a flow with no corresponding transmission device;
generating a connection table (step S03) by collecting, for each port of the transfer device (23, 24), a name and a physical address of the opposing device which is the transmission device 21 or the reception device 22 connected to the port;
calculating an expected traffic amount (step S04) by adding, for each port of the transfer device, amounts of traffic in all the flows corresponding to the opposing device from the transmission/reception flow table on the basis of the name of the opposing device in the connection table;

determining an observed traffic amount by actually measuring traffic for each port of the transfer device; and comparing the observed traffic amount and the expected traffic amount, and determining an abnormality in traffic amount when there is a predetermined deviation or more therebetween (steps S05, S07).

First, the flow table generation circuit 11 prepares a transmission/reception IP flow table which aggregates information on IP flows for transmitting and receiving a video (step S01). In preparation for preparing a transmission/reception IP flow table, the flow table generation circuit 11 prepares a transmission IP flow table and a reception IP flow table using the NMOS.

The transmission IP flow table includes a transmission device name, a transmission MAC address, a transmission source address, a transmission source port, a destination address, and a destination port. FIG. 5 illustrates an example of the transmission IP flow table. For the transmission device name and the transmission MAC address, hostname and port_id included in self.json of NMOS IS-04 are respectively used. FIG. 6 illustrates an example of self.json. For the transmission source address, the transmission source port, the destination address, and the destination port, source_ip, source_port, destination_ip, and destination_port included in active.json in sender of NMOS IS-05 are respectively used. FIG. 7 illustrates an example of active.json.

The reception IP flow table includes a reception device name, a reception MAC address, a transmission source address, a transmission source port, a destination address, and a destination port. FIG. 8 illustrates an example of the reception IP flow table. For the reception device name and the reception MAC address, hostname and port_id in self.json are respectively used. For the transmission source address, the transmission source port, the destination address, and the destination port, source_ip, source_port, destination_ip, and destination_port included in active.json in receivers of NMOS IS-05 are respectively used.

The transmission/reception IP flow table includes a transmission device name, a transmission MAC address, a reception device name, a reception MAC address, a transmission source address, a transmission source port, a destination address, and a destination port. FIG. 9 illustrates an example of the transmission/reception IP flow table. The flow table generation circuit 11 prepares a transmission/reception IP flow table by combining the transmission IP flow table and the reception IP flow table. At this time, the flow table generation circuit 11 integrates entries for IP flows with the same transmission source address, transmission source port, destination address, and destination port. In case of multicasting, there may be a plurality of reception devices.

The flow table generation circuit 11 makes the fields of the reception device name and the reception MAC address in the transmission/reception IP flow table blank for an IP flow with no corresponding reception device. In addition, the flow table generation circuit 11 makes the fields of the transmission device name and the transmission MAC address in the transmission/reception IP flow table blank for an IP flow with no corresponding transmission device.

The flow table generation circuit 11 may issue an alert (step S06) by determining that there is an abnormality in a terminal that transmits or receives an IP flow in the case where there is an entry including a blank field in the transmission/reception IP flow table ("Yes" in step S02). When this alert is issued, an error in the configuration of connection or the setting of the video transmission device 21 or the video reception device 22 is suspected.

Subsequently, the connection table generation circuit 12 prepares a connection table (step S03) including a port number, a MAC address (opposing MAC address) of a connected device, and a name (opposing device name) of the connected device for each IP packet transfer device (23, 24). FIG. 10 illustrates an example of the connection table. First, Link Layer Discovery Protocol (LLDP) is used for each port to acquires a MAC address of a device connected to the port. For a port for which a MAC address has been acquired, the transmission/reception IP flow table is searched for an opposing MAC address, and a corresponding device name is registered as an opposing device name.

Next, the calculation circuit 13 calculates an expected amount of video traffic (expected traffic amount) for a port that has an opposing device name registered in the connection table (step S04). The calculation circuit 13 searches the transmission/reception IP flow table for the name of a device connected to the port, calculates expected traffic amounts for all the IP flows, and determines the total value as an expected traffic amount for the port. The method of calculating an expected traffic amount for each IP flow is as follows.

When the width, height, bit depth, frame rate, and number of samples per pixel of video in a flow i are defined as $W_i$, $H_i$, $D_i$, $F_i$, and $C_i$, respectively, an expected traffic amount $b_i$ (bps) for the IP flow can be calculated by the following formula:

$$b_i = W_i \times H_i \times D_i \times F_i \times C_i \qquad \text{[Expression 1]}$$

For $W_i \times H_i \times D_i \times F_i$, the values of width, height, depth, and exactframerate indicated in transportfile in senders of NMOS IS-05 are respectively used. FIG. 11 illustrates an example of transportfile. $C_i$ is 2 when sampling=YCbCr-4:2:2, and is 3 when sampling=RGB-4:4:4.

For example, parameters of the flow indicated in transportfile in FIG. 11 are as follows:
width=1920
height=1080
depth=10
exactframerate=60000/1001
sampling=YCbCr-4:2:2

The amount of traffic expected for the flow is calculated by substituting the above parameters into Expression 1:

$$1920 \times 1080 \times 10 \times (60000/1001) \times 2 \approx 2.5 \text{ Gbps}$$

Further, when a set of the numbers of flows that flow through a port is defined as P, a total expected amount $B_i$ (bps) of traffic that flows through the port can be calculated by the following formula:

$$B_i = \Sigma_{i \in P} b_i \qquad \text{[Expression 2]}$$

Finally, the comparison circuit 14 compares the amount (observed traffic amount) of traffic actually observed for each port of the IP packet transfer device and the expected traffic amount (step S05). The comparison circuit 14 defines the observed traffic amount for a port and the allowable error rate as $B_i'$ and $\delta$, respectively, and issues an alert (step S07) when the following formula is met, since there is too large a deviation between the expected traffic amount and the observed traffic amount:

$$|1 - B_i'/B_i| > \delta \qquad \text{[Expression 3]}$$

For example, SONiC, which is open-source switch operating software, can acquire the amount of actual traffic for each port using a "show interface counters" command. FIG.

12 illustrates an example of the result of executing a "show interface counters" command. δ is set such that fluctuations in the amount of traffic in the normal range are not detected as an abnormality, and is set to 0.01, for example.

Second Embodiment

The abnormality computation device 10 can also be implemented by a computer and a program, and the program can be stored in a storage medium or provided through a network.

Figure 14:
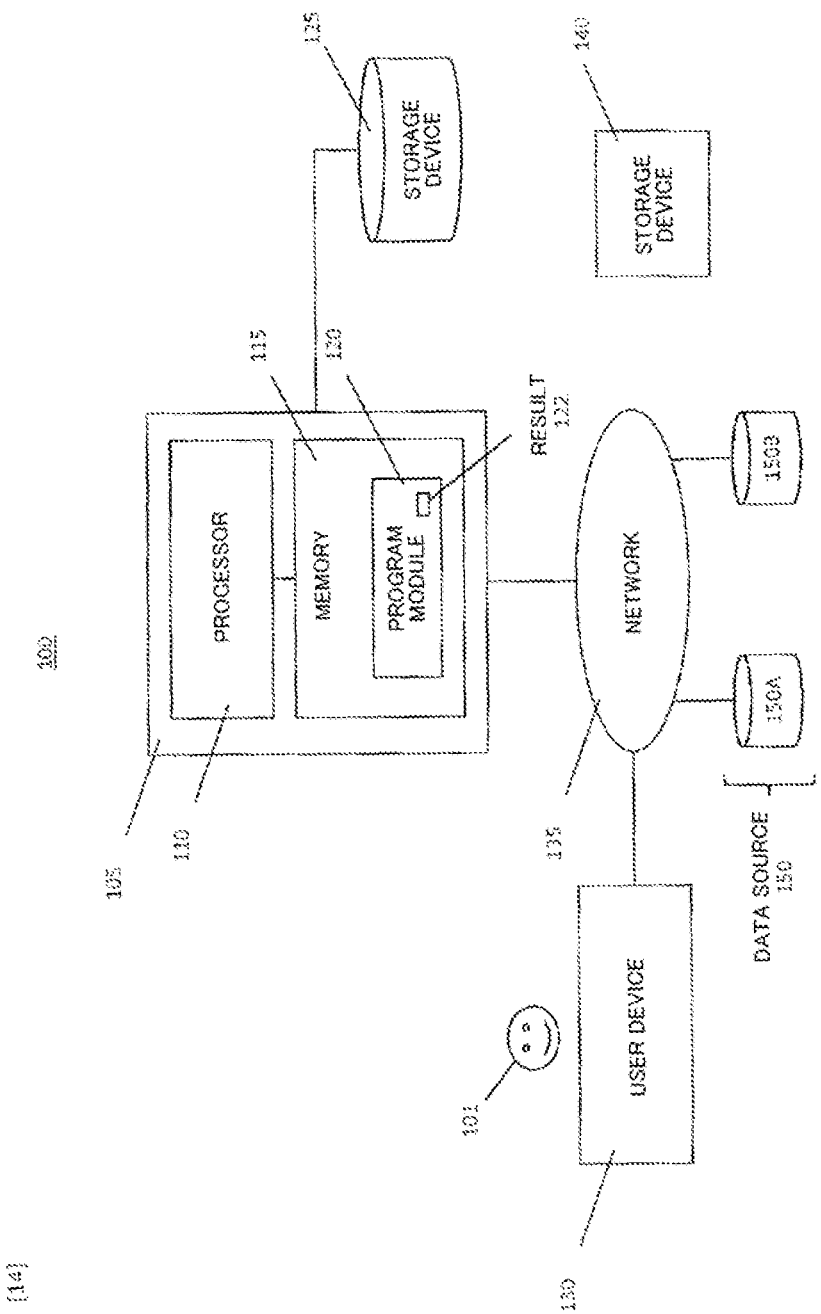
FIG. 14 illustrates a program according to the present invention.

FIG. 14 is a block diagram of a system 100. The system 100 includes a computer 105 connected to a network 135.

The network 135 is a data communication network. The network 135 may be a private network or a public network, and can include some or all of (a) a personal area network that covers a certain room, for example, (b) a local area network that covers a certain building, for example, (c) a campus area network that covers a certain campus, for example, (d) a metropolitan area network that covers a certain city, for example, (e) a wide area network that covers a region connected beyond the boundary between cities, districts, or countries, for example, and (f) the Internet. Communication is made using an electronic signal or an optical signal via the network 135.

The computer 105 includes a processor 110 and a memory 115 connected to the processor 110. While the computer 105 is represented as a stand-alone device herein, the computer 105 is not limited thereto, and may be connected to another device (not illustrated) in a distributed processing system.

The processor 110 is an electronic device constituted of a logical circuit that responds to an instruction and that executes the instruction.

The memory 115 is a tangible storage medium that stores an encoded computer program and that can be read by a computer. In this respect, the memory 115 stores data and instructions, that is, program codes, that can be read and executed by the processor 110 in order to control operation of the processor 110. The memory 115 can be implemented by a random access memory (RAM), a hard drive, a read only memory (ROM), or a combination thereof. One constituent element of the memory 115 is a program module 120.

The program module 120 includes instructions for controlling the processor 110 so as to execute the process described herein. While the operation is described as being executed by the computer 105 or a method or a process or lower-level processes herein, the operation is actually executed by the processor 110.

The term "module" is used herein to refer to functional operation that may be implemented as any of a stand-alone constituent element or an integrated component constituted from a plurality of lower-level constituent elements. Thus, the program module 120 may be implemented as a single module or a plurality of modules that operate in coordination with each other. Further, while the program module 120 is described herein as being installed in the memory 115, that is, implemented by software, the program module 120 can be implemented by hardware (e.g. an electronic circuit), firmware, software, or a combination thereof.

While the program module 120 is indicated as having already been loaded into the memory 115, the program module 120 may be configured to be located on a storage device 140 to be thereafter loaded into the memory 115. The storage device 140 is a tangible storage medium that stores the program module 120 and that can be read by a computer. Examples of the storage device 140 include a Compact Disc, a magnetic tape, a read only memory, an optical storage medium, a hard drive or a memory unit constituted of a plurality of parallel hard drives, and a Universal Serial Bus (USB) flash drive. Alternatively, the storage device 140 may be a random access memory or an electronic storage device of other types located in a remote storage system (not illustrated) and connected to the computer 105 via the network 135.

The system 100 further includes a data source 150A and a data source 150B referred to collectively as a "data source 150" herein and communicably connected to the network 135. In practice, the data source 150 can include any number of data sources, that is, one or more data sources. The data source 150 includes non-systematized data, and can include social media.

The system 100 further includes a user device 130 operated by a user 101 and connected to the computer 105 via the network 135. The user device 130 may be an input device, such as a keyboard or a voice recognition subsystem, that enables the user 101 to transmit information and command selection to the processor 110. The user device 130 further includes an output device such as a display device, a printer, or a voice synthesis device. A cursor control unit such as a mouse, a trackball, or a touch-sensitive screen enables the user 101 to operate a cursor on the display device in order to transmit further information and command selection to the processor 110.

The processor 110 outputs a result 122 of execution of the program module 120 to the user device 130. Alternatively, the processor 110 can deliver the output to a storage device 125 such as a database or a memory, for example, or deliver the output to a remote device (not illustrated) via the network 135.

A program that performs the flowchart in FIG. 3 may be the program module 120, for example. The system 100 can be caused to operate as the abnormality detection device 10.

While the terms "comprise" and "comprising" indicates the existence of a characteristic, a complete body, a process, or a constituent element mentioned, the terms should be construed as not excluding the existence of one or more other characteristics, complete bodies, processes, constituent elements, or groups thereof. The terms "a" and "an" are indefinite articles, and thus do not exclude an embodiment with a plurality of referents.

Other Embodiments

The invention is not limited to the embodiments described above, and can be implemented with a variety of modifications within the scope and spirit of the invention. In short, the invention is not limited to the embodiments described above as they are, and can be implemented with constituent elements modified within the scope and spirit thereof at the stage of implementation.

A variety of inventions can be formed by an appropriate combination of a plurality of constituent elements disclosed in relation to the embodiments described above. For example, some of all of the constituent elements described in relation to the embodiments may be deleted. Further, constituent elements in different embodiments may be combined as appropriate.

Effects of the Invention

With the present invention, it is possible to automatically calculate an amount of traffic expected for an IP packet transfer device, and automatically detect an abnormality in the amount of traffic. Efficient operation is enabled since it is not necessary to set an expected amount of traffic in advance. It is also possible to specify which IP packet transfer device on a transmission path an abnormality in traffic is caused in. Further, even in the case where a video transmission device itself does not support the information collection protocol, it is also possible to detect an abnormality in the transmission device by detecting the presence or absence of an abnormality in traffic at a port of an IP packet transfer device connected to the abnormality detection device.

INDUSTRIAL APPLICABILITY

The present invention is applicable to a video transmission state abnormality detection method and a video transmission state abnormality detection device for detecting an abnormality in the state of transmission of an uncompressed video and an uncompressed sound.

REFERENCE SIGNS LIST

10 Abnormality detection device
11 Flow table generation circuit
12 Connection table generation circuit
13 Calculation circuit
14 Comparison circuit
21 Transmission device
22 Reception device
23, 24 Transfer device

The invention claimed is:

1. An abnormality detection device that detects an abnormality in signal transmission, the abnormality detection device being connected to a network including a transmission device that transmits a signal, a reception device that receives the signal, and a transfer device that transfers the signal from the transmission device to the reception device, the abnormality detection device comprising:
   a flow table generation circuit that collects transmission source information and destination information for the signal for each transmission device, that collects transmission source information and destination information for the signal for each reception device, and that generates a transmission/reception flow table by aggregating entries for flows with the same transmission source address, transmission source port, destination address, and destination port, among the transmission source information and the destination information;
   a connection table generation circuit that generates a connection table by collecting, for each port of the transfer device, a name and a physical address of a given device which is the transmission device or the reception device connected to the port;
   a calculation circuit that calculates an expected traffic amount by adding, for each port of the transfer device, amounts of traffic in all the flows corresponding to the given device from the transmission/reception flow table on the basis of the name of the given device in the connection table; and
   a comparison circuit that compares an observed traffic amount of traffic measured and the expected traffic amount for each port of the transfer device, and that determines that there is an abnormality in traffic amount when there is a predetermined deviation or more therebetween.

2. The abnormality detection device according to claim 1, wherein
the flow table generation circuit determines that there is an abnormality in connection or setting of the transmission device or the reception device when there is an entry including a blank field in the transmission/reception flow table.

3. An abnormality detection method of detecting an abnormality in signal transmission in a network including a transmission device that transmits a signal, a reception device that receives the signal, and a transfer device that transfers the signal from the transmission device to the reception device, the abnormality detection method comprising:
   collecting transmission source information and destination information for the signal for each transmission device, collecting transmission source information and destination information for the signal for each reception device, and generating a transmission/reception flow table by aggregating entries for flows with the same transmission source address, transmission source port, destination address, and destination port, among the transmission source information and the destination information;
   generating a connection table by collecting, for each port of the transfer device, a name and a physical address of a given device which is the transmission device or the reception device connected to the port;
   calculating an expected traffic amount by adding, for each port of the transfer device, amounts of traffic in all the flows corresponding to the given device from the transmission/reception flow table on the basis of the name of the given device in the connection table;
   determining an observed traffic amount by measuring traffic for each port of the transfer device; and
   comparing the observed traffic amount and the expected traffic amount, and determining an abnormality in traffic amount when there is a predetermined deviation or more therebetween.

4. The abnormality detection method according to claim 3, further comprising
   determining that there is an abnormality in connection or setting of the transmission device or the reception device when there is an entry including a blank field in the transmission/reception flow table.

5. A non-transitory computer-readable medium having computer-executable instructions that, upon execution of the instructions by a processor of a computer, cause the computer to execute an abnormality detection method of detecting an abnormality in signal transmission in a network including a transmission device that transmits a signal, a reception device that receives the signal, and a transfer device that transfers the signal from the transmission device to the reception device,
   wherein the abnormality detection method comprises:
   collecting transmission source information and destination information for the signal for each transmission device, collecting transmission source information and destination information for the signal for each reception device, and generating a transmission/reception flow table by aggregating entries for flows with the same transmission source address, transmission source port, destination address, and destination port, among the transmission source information and the destination information;
   generating a connection table by collecting, for each port of the transfer device, a name and a physical address of a given device which is the transmission device or the reception device connected to the port;

calculating an expected traffic amount by adding, for each port of the transfer device, amounts of traffic in all the flows corresponding to the given device from the transmission/reception flow table on the basis of the name of the given device in the connection table;

determining an observed traffic amount by measuring traffic for each port of the transfer device; and comparing the observed traffic amount and the expected traffic amount, and determining an abnormality in traffic amount when there is a predetermined deviation or more therebetween.

6. The non-transitory computer-readable medium according to claim 5, wherein the abnormality detection method further comprises determining that there is an abnormality in connection or setting of the transmission device or the reception device when there is an entry including a blank field in the transmission/reception flow table.

* * * * *